UNITED STATES PATENT OFFICE.

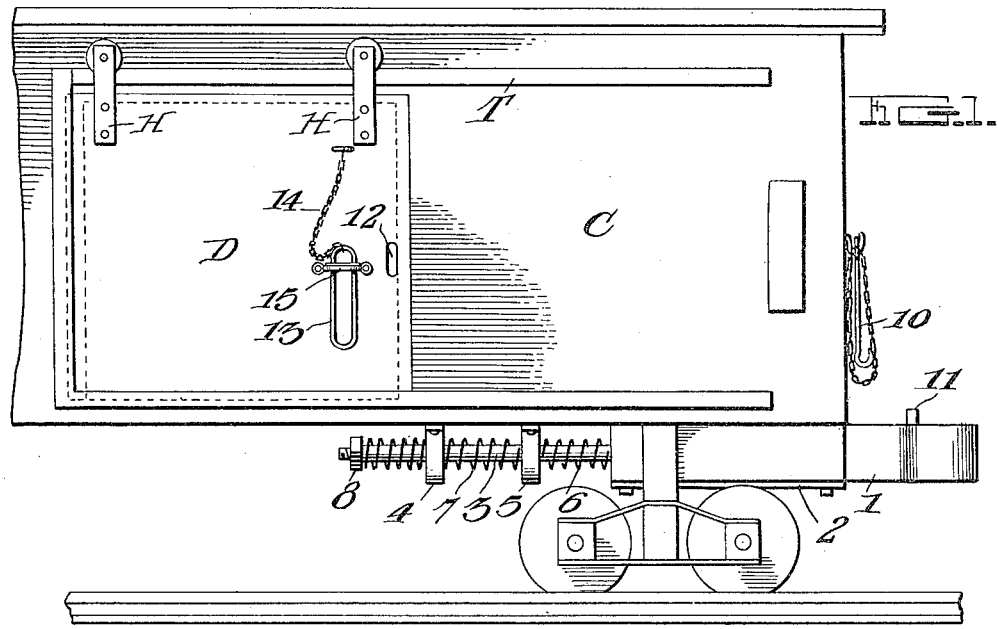
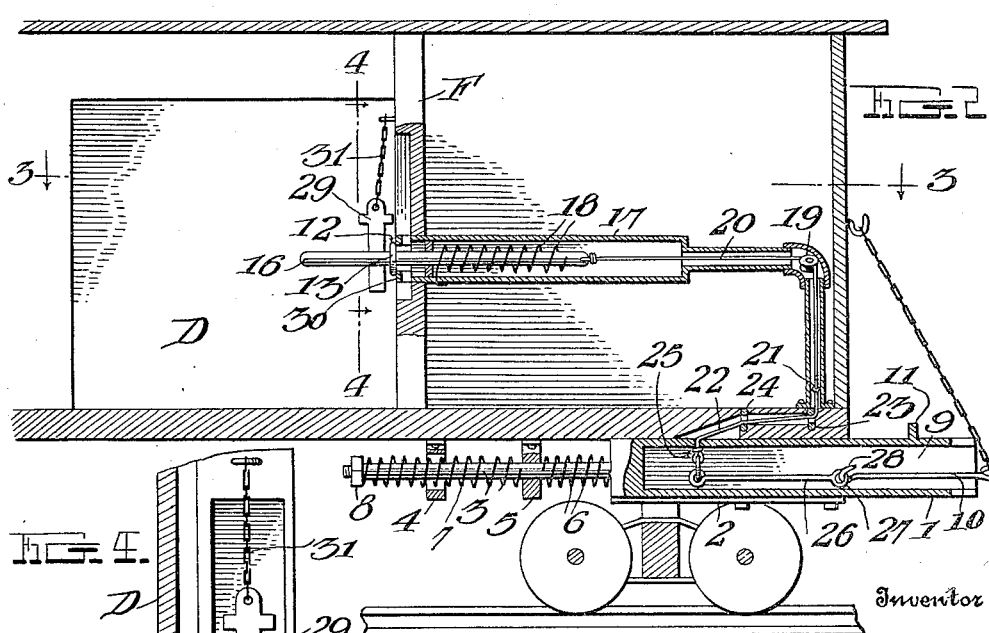
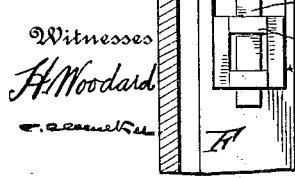

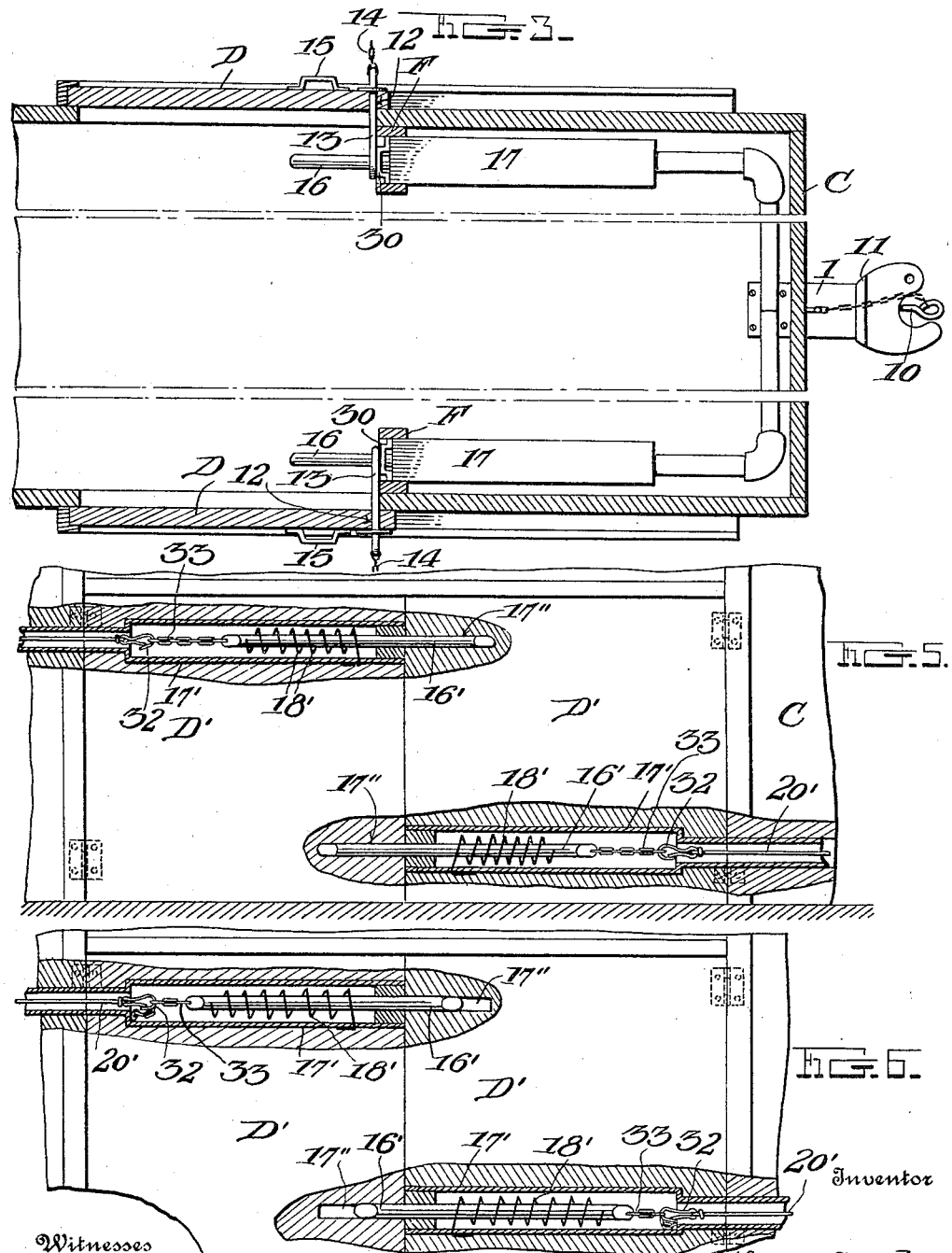

HARRY GORDON, OF BOISE, IDAHO.

CAR-DOOR LOCK.

1,133,953.  Specification of Letters Patent.  Patented Mar. 30, 1915.

Application filed June 15, 1914.  Serial No. 845,189.

*To all whom it may concern:*

Be it known that I, HARRY GORDON, citizen of the United States, residing at Boise, in the county of Ada and State of Idaho, have invented certain new and useful Improvements in Car-Door Locks; and I do declare the following to be a full, clear, and exact description of the invention, such as will enable others skilled in the art to which it appertains to make and use the same.

My invention relates to improvements in car door locks and has for its primary object to provide a simple and efficient lock so constructed as to prevent the same from being released when the cars, to which it is applied, are coupled.

In carrying out the above end, I provide sliding latch bolts mounted in the car doors, hollow draw bars, flexible connections attached to the latches and having one of their ends disposed in the hollow draw bars and means whereby said flexible connections may be retracted by the insertion of a tool in the draw bars.

A secondary object of the invention is to provide means whereby the latch bolts may be totally or partially withdrawn, the object of this to be hereinafter explained.

A further object of the invention is to construct the entire device in the most simple manner consistent with its proper operation.

With these objects in view, the invention resides in certain novel features of construction and combination herein described and claimed and shown in the drawings wherein:

Figure 1 is a side elevation of a portion of a freight car showing the application of my invention thereto; Fig. 2 is a vertical longitudinal section through the parts shown in Fig. 1, a portion of the side of the car being in section; Fig. 3 is a horizontal section taken on the line 3—3 of Fig. 2; Fig. 4 is a detail vertical transverse section taken on the line 4—4 of Fig. 2, showing more particularly the means for retaining the latch bolt in retracted position; Fig. 5 is a vertical longitudinal section through the central portion of a car having outwardly swinging doors, portions of said doors being in section, and Fig. 6 is a view similar to Fig. 5 showing the latch bolts partially retracted.

In the accompanying drawings, from Figs. 1 to 4 inclusive, I have shown portions of a freight car C beneath which a hollow draw bar 1 is slidably mounted in suitable guides 2, said bar having an inwardly extending attaching bar 3 which slides through inner and outer transverse guide bars 4 and 5, a cushioning spring 6 being interposed between the bar and the inner end of the draw bar 1 while a second spring 7 contacts with the inner surface of the bar 5 and with a nut 8 carried on the inner end of the bar 3, said spring 7 passing loosely through the opening in the transverse bar 4. As clearly seen in Fig. 2, the bore 9 of the draw bar 1 opens through its outer end in order that a hook shaped tool 10 may be inserted for the purpose of retracting a cable in a manner to be described. It will further be noted that the draw bar 1 is provided with an upright stop 11 which is adapted to limit its inward movement while its outward movement is limited by the nut 8. Supported upon tracks T by means of suitable hangers H, are the usual sliding doors D which move toward the draw bar 1 when opened. Each door is provided with a transverse slot 12 on the end adjacent the draw bar 1, said slots being adapted to receive elongated loops or links 13 which are normally supported by chains 14 attached to the outer sides of the doors, suitable guide loops 15 being preferably employed for the purpose of preventing excessive swinging of the chains and links when the car is in motion. As most clearly seen in Fig. 3, the links 13 extend inwardly when removed from their guides 15 and inserted through the slots 12, the inwardly extending ends of said links receiving the free ends of latch bolts 16 which are slidably mounted in longitudinal guide sleeves 17 mounted within the car, said bolts 16 being normally projected by coil springs 18 which encircle their inner ends, said springs being attached, at their inner ends, to the inner ends of the bolts 16 while their outer ends are attached to suitable portions of the guide sleeve 17. Secured to the inner ends of the bolts 16 and passing over suitable guides 19, disposed in the end corners of the car, are cables 20 which then converge downwardly and are united at 21 to a single cable 22 which latter passes through outer and inner guides 23 and 24 respectively, positioned in the bottom of the car, said cable 22 then inclining downwardly and inwardly and passing through an opening 25 in the upper side of the draw bar 1 and being attached to the inner end of a link 26, located within the bore 9 of said draw bar and having an eye 27 on its outer end, said eye being adapted to receive the bill 28 of the tool 10 when the latter is inserted, thereby allowing the cable to be pulled outwardly thus retracting the latch bolts 16. When it is desired to have the bolt 16 retracted, while the doors D remain open, said bolts may be moved inwardly in the sleeves 17 and retained in this position by means of suitable latch plates 29 which may be positioned in suitable guides 30 carried by the exposed ends of the sleeves 17, said latch plates being normally suspended by chains 31 which are attached within the car.

It is to be noted that the inner ends of the latch bolts 16 project a considerable distance through the loops or links 13, thus allowing considerable inward and outward movement on the part of the draw bar 1 without retracting said bolts to an extent great enough to release said links. It will also be noted that the doors can not be unlocked as long as two cars are coupled together since access into the interior of their draw heads may not be had until the same are uncoupled. When the parts are positioned as seen in Fig. 3, it will be readily understood that longitudinal movement of the doors D is prevented by the fact that the inner ends of the links 13 contact with the door frames F. I have found it desirable to have the doors, on the two sides of the car, move in the same direction for opening and closing, thereby necessitating but one hollow draw bar for the purpose of actuating the latch bolts.

In Figs. 5 and 6 I have shown a portion of a car C' which is provided with a pair of outwardly swinging hinged doors D'. In employing the latch mechanism with this type of car door, suitable guide sleeves 17' are located in longitudinal bores in each of the doors D' and the bolts 16' are normally projected by springs 18' into recesses 17' formed in the meeting edges of the doors. In this connection, the construction of the draw bars and the parts located therein is identical with the construction previously described and further illustration and description is therefore thought to be unnecessary. The cables 20', however, are not connected directly with the latch bolts 16' but are provided with snap hooks 32 on their inner ends, said hooks being adjustably engaged with the links of chains 33 which are connected to the inner ends of the latch bolts 16'. As seen in Fig. 5, the latch bolts 16' may be projected to their full extent by engaging the snap hooks 32 with the endmost links of the chains 33, may be totally retracted and held in retracted position by engaging said hooks with links located closely to the latch bolts or may be partially retracted by positioning the hooks intermediate the ends of the chains 33, this last mentioned position being employed only when the car is being employed for conveying local freight. In this connection, with the latch bolts 16' partially retracted the draw bar 1 at one end of the car C' may be moved inwardly while the draw bar at the opposite end thereof may be moved outwardly thus retracting said bolts 16' to allow the doors to be swung open, the draw bars being operated by a suitable tool (not shown) very similar to that illustrated in Fig. 5 of my U. S. Patent #1,034,615. It may here be explained that in this connection, the outer ends of the latch bolts 16' are preferably beveled for the purpose of allowing them to be more readily engaged with the recesses 17" when the doors are closed.

From the foregoing description, taken in connection with the accompanying drawings, it will be seen that I have produced a comparatively simple locking mechanism for freight cars yet one which will be highly efficient in operation.

Having described my invention, what I claim as new and desire to secure by Letters-Patent is:

1. The combination with a railway car having locking means for one of its doors, of a hollow draw bar beneath the car and operating means for said locking means confined within said draw bar, the interior of the drawbar being accessible from the exterior thereof.

2. The combination with a railway car and locking means for one of the doors thereof, of a hollow draw bar beneath the car and having an opening, and a flexible operating element having one of its ends attached to said locking means, its other end passing through said opening and terminating in the hollow draw bar, the interior of the draw bar being accessible from the exterior thereof.

3. The combination with a railway car and locking means for one of its doors, of a draw bar beneath the car and having a bore opening through its outer end and an opening through its top, guides on the car, a flexible operating element connected to said locking means and passing around said guides, its opposite end passing through said openings into the bore of the draw bar, and an operating member on said cable and located in said bore, said member being adapted to be engaged by a tool whereby said flexible element may be actuated to trip said locking means.

4. The combination with a railway car having a locking bolt for one of its doors, and a slidably mounted draw bar beneath the car, of a connection between said bolt and said draw bar and means whereby said connection may be operated independently of the movements of the draw bar.

5. The combination with a railway car having a locking bolt for one of its doors and a slidably mounted draw bar beneath the car, of an adjustable connection between the draw bar and the bolt and means whereby said connection may be operated independently of the movements of the draw bar.

6. The combination with a railway car having a locking bolt for one of its doors, and a sliding draw bar beneath the car, of a flexible cable connected with said draw bar and terminating adjacent the locking bolt, an adjustable connection between said cable and said bolt and means whereby the cable may be operated independently of the movements of the draw bar.

In testimony whereof I have hereunto set my hand in presence of two subscribing witnesses.

HARRY GORDON.

Witnesses:
T. S. RISSER,
J. C. JOHNSON.

Copies of this patent may be obtained for five cents each, by addressing the "Commissioner of Patents, Washington, D. C."